(12) United States Patent
Mu

(10) Patent No.: US 12,114,307 B2
(45) Date of Patent: Oct. 8, 2024

(54) METHOD AND APPARATUS FOR INFORMATION PROCESSING

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 371 days.

(21) Appl. No.: 17/625,656

(22) PCT Filed: Jul. 9, 2019

(86) PCT No.: PCT/CN2019/095308
§ 371 (c)(1),
(2) Date: Jan. 7, 2022

(87) PCT Pub. No.: WO2021/003675
PCT Pub. Date: Jan. 14, 2021

(65) Prior Publication Data
US 2022/0279553 A1  Sep. 1, 2022

(51) Int. Cl.
*H04W 72/1273* (2023.01)
*H04W 56/00* (2009.01)
*H04W 72/0446* (2023.01)
*H04W 72/0453* (2023.01)

(52) U.S. Cl.
CPC ..... *H04W 72/1273* (2013.01); *H04W 56/001* (2013.01); *H04W 72/0446* (2013.01); *H04W 72/0453* (2013.01)

(58) Field of Classification Search
CPC .......... H04W 72/1273; H04W 56/001; H04W 72/0446; H04W 72/0453
See application file for complete search history.

(56) References Cited

U.S. PATENT DOCUMENTS

2018/0376454 A1* 12/2018 Åström ............ H04W 72/0446
2019/0059111 A1*  2/2019 Zhang ............... H04W 74/0833
2019/0159203 A1   5/2019 Kim et al.

FOREIGN PATENT DOCUMENTS

| CN | 104349333 A * | 2/2015 | ............ H04W 16/18 |
| WO | WO 2019096298 A1 | 5/2019 | |
| WO | WO-2019116477 A1 * | 6/2019 | ........... G06F 40/166 |

OTHER PUBLICATIONS

PCTCN2019095308 English translation of International Search Report dated Apr. 2, 2020, 2 pages.

* cited by examiner

*Primary Examiner* — Duc C Ho
(74) *Attorney, Agent, or Firm* — Cozen O'Connor

(57) ABSTRACT

A method and apparatus for information processing. The method includes: configuring scheduling information of an SIB1 for a first-type UE; sending the scheduling information of the SIB1 to the first-type UE by carrying the scheduling information of the SIB1 in an SSB, such that the first-type UE receives the SIB1 on the basis of the scheduling information of the SIB1.

16 Claims, 5 Drawing Sheets configuring scheduling information of a system information block (SIB) 1 for a first-type user equipment (UE) — S11 sending the scheduling information of the SIB1 to the first-type UE by carrying the scheduling information of the SIB1 in a synchronization signal block (SSB) — S12

METHOD AND APPARATUS FOR INFORMATION PROCESSING

CROSS-REFERENCE TO RELATED APPLICATION

This application is the US national phase application of International Application No. PCT/CN2019/095308, filed on Jul. 9, 2019, the entire contents of which are incorporated herein by reference.

TECHNICAL FIELD

The disclosure relates to a field of communications technologies, and particularly to a method and apparatus for information processing, and a computer storage medium.

BACKGROUND

In the New Radio-Internet of Thing (NR-IoT) system, in order to access a channel, a user Equipment (UE) first synchronizes with a base station, obtains a system broadcast message, and further obtains parameters for accessing the system. Currently, detection steps of the system message are tedious, and it is necessary to blind check the Physical Downlink Control Channel (PDCCH) for many times. However, blind check of PDCCH consumes a large amount of power for NR-IoT UE, which does not meet the requirement of saving power for the NR-IoT UE.

SUMMARY

According to a first aspect of embodiments of the disclosure, a method for information processing is provided, including:
  configuring scheduling information of a system information block SIB1 for a first-type user equipment UE; and
  sending the scheduling information of the SIB1 to the first-type UE by carrying the scheduling information of the SIB1 in a synchronization signal block SSB.

According to a second aspect of embodiments of the present disclosure, a method for information processing is provided, including:
  determining scheduling information of a system information block SIB1 carried in a synchronization signal block SSB; and
  receiving the SIB1 according to the scheduling information of the SIB1.

According to a third aspect of embodiments of the present disclosure, an apparatus for information processing is provided, including:
  a processor; and
  a memory, configured to store instructions executable by the processor;
  wherein, the processor is configured to implement any foregoing method for information processing applied to a base station side, by executing the executable instructions.

According to a fourth aspect of embodiments of the present disclosure, an apparatus for information processing is provided, including:
  a processor; and
  a memory configured to store instructions executable by the processor;
  wherein, the processor is configured to implement any foregoing method for information processing applied to a first-type UE side, by executing the executable instructions.

According to a fifth aspect of embodiments of the present disclosure, there is provided a non-transitory computer storage medium stored with computer instructions thereon, which when executed by a processor, causes the processor to implement any foregoing method for information processing applied to a base station side.

According to a sixth aspect of embodiments of the present disclosure, there is provided a non-transitory computer readable storage medium stored with computer instructions thereon, which when executed by a processor, causes the processor to implement any foregoing method for information processing applied to a first-type UE side.

It should be understood that the general description above and the detailed description below are illustrative and explanatory only and do not limit the disclosure.

BRIEF DESCRIPTION OF THE DRAWINGS

The appended drawings herein are incorporated into the specification and form part of the specification, showing embodiments consistent with the present invention and used together with the specification to explain the principles of the present invention.

DETAILED DESCRIPTION

Embodiments will be explained in detail here, and examples are shown in the attached drawings. Where the following description relates to appended drawings, the same numbers in different appended drawings indicate the same or similar elements, unless otherwise indicated. Implementations described in the following example embodiments do not represent all implementations consistent with the present invention. Rather, they are merely examples of devices and methods which are consistent with some aspects of the invention as detailed in the attached claims.

The terms used in embodiments of the disclosure are intended merely to describe a particular embodiment and are not intended to limit embodiments of the disclosure. The singular forms "one", "a" and "the" used in embodiments of the disclosure and the attached claims are also intended to include majority forms, unless the context clearly indicates otherwise. It should also be understood that the terms "and/or" used herein refer to and include any or all possible combinations of one or more associated listed items.

It should be understood that, although terms first, second, third, etc., may be used in embodiments of the disclosure to describe various information, such information should not be limited to those terms. These terms are used only to distinguish information of the same type from one another. For example, without departing from the scope of embodiments of the disclosure, first information may also be referred to as second information, and similarly, second information may also be referred to as first information. Depending on the context, the words "if" used here can be interpreted as "when . . . " or "in a case that . . . " or "in response to determining".

Figure 1:
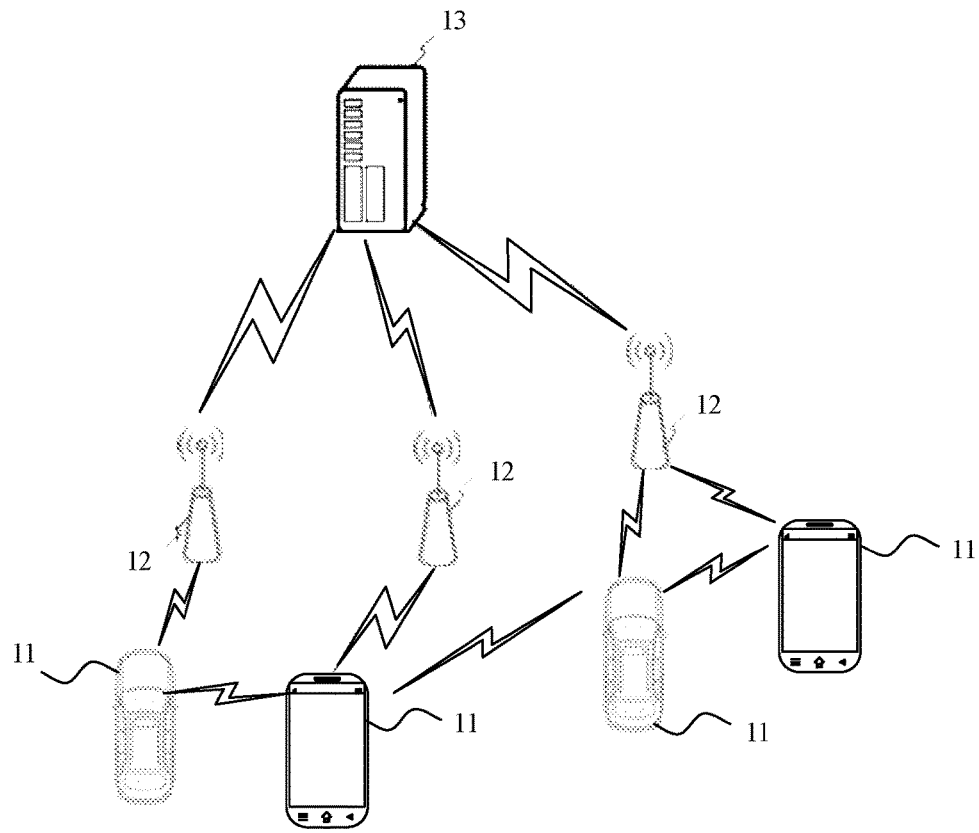
FIG. 1 is a schematic diagram of a wireless communication system according to an example embodiment of the disclosure.

FIG. 1 shows a schematic diagram of a wireless communication system provided by embodiments of the disclosure. As shown in FIG. 1, the wireless communication system is a communication system based on cellular mobile communication technology. The wireless communication system can include several terminals 11 and several base stations 12.

The terminal 11 may be a device that provides voice and/or data connectivity to users. The terminal 11 can communicate with one or more core networks over a Radio Access Network (RAN), and the terminal 11 may be IoT terminals such as sensor devices, mobile phones (or "cellular" phones), and computers with IoT terminals, for example, which may be stationary, portable, pocket, handheld, computer-built or vehicle-mounted devices. For example, station, STA, subscriber unit, subscriber station, mobile station, mobile, remote station, access point, remote terminal, access terminal, user terminal, user agent, user device, or user equipment (UE). Alternatively, the terminal 11 may also be an unmanned vehicle. Alternatively, the terminal 11 may also be an on-board device, for example, a driving computer with wireless communication capabilities, or a wireless communication device connected to an external driving computer. Alternatively, the terminal 11 may also be a roadside device, such as a street lamp, signal light, or other roadside device with wireless communication capabilities.

The base station 12 may be a network side device in a wireless communication system. The wireless communication system may be the 4th generation mobile communication (4G) system, also known as Long Term Evolution (LTE) system. Alternatively, the wireless communication system may be a 5G system, also known as a New Radio (NR) system or a 5G NR system. Alternatively, the wireless communication system may be the next generation of 5G systems. The access network in 5G system may be called NG-RAN (New Generation-Radio Access Network). Alternatively, the wireless communication system may be a machine-type Communication (MTC) system.

The base station 12 may be an evolved base station (eNB) used in 4G systems. Alternatively, the base station 12 may also be a base station with a centralized distributed architecture (gNB) in 5G systems. When the base station 12 adopts a centralized distributed architecture, it usually includes a central unit (CU) and at least two distributed units (DUs). The centralized unit is set with protocol stacks of Packet Data Convergence Protocol (PDCP) layer, Radio Link Control (RLC) layer, Media Access Control (Media Access Control) layer. The distributed unit is provided with a Physical (PHY) layer protocol stack. The specific implementation of the base station 12 is not limited in embodiments of the disclosure.

A wireless connection may be established between the base station 12 and the terminal 11 through a radio-based air interface. In different implementations, the radio-based air interface is based on the fourth generation mobile communication network technology (4G) standard; or, the radio-based air interface is based on the fifth generation mobile communication network technology (5G) standard, such as the radio-based air interface is a new air interface; or, the radio air interface may be based on the next generation mobile network technology standards of 5G.

In some embodiments, an E2E (End to End) connection may also be established between terminals 11, for example, in vehicle-to-vehicle (V2V), vehicle-to-Infrastructure (V2I), and vehicle-to-pedestrian (V2P) communication in Vehicle to Everything (V2X) communication scenarios.

In some embodiments, the wireless communication system may also include a network management device 13.

Several base stations 12 are connected with the network management device 13 respectively. The network management device 13 may a core network device in a wireless communication system. For example, the network management device 13 may be a Mobility Management Entity (MME) in Evolved Packet Core (EPC) networks. Alternatively, the network management device may be other core network devices, such as the Serving Gate Way (SGW), Public Data Network Gate Way (PGW), Policy and Charging Rules Function (PCRF) or Home Subscriber Server (HSS), etc. The implementation form of the network management device 13 is not limited in embodiments of the disclosure.

Figure 2:
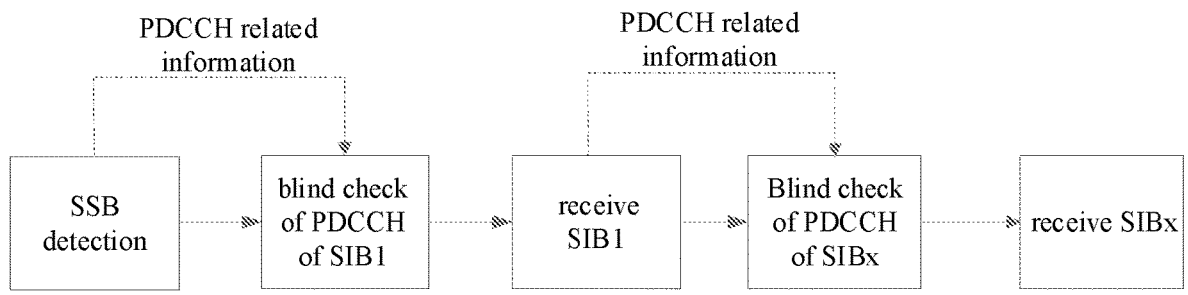
FIG. 2 is a flow chart of obtaining system broadcast messages according to an example embodiment of the disclosure.

In related technologies, the process of obtaining system broadcast messages is shown in FIG. 2, and the specific process is as follows.

1. The user terminal reads information in the Synchronization Signal/PBCH Block (SSB) to obtain configuration information of Control Resource Set 0 (CORESET0), including frequency location, bandwidth, time resources and other information. The Physical Downlink Control Channel (PDCCH) for system message scheduling sent to the user terminal will be transmitted in CORESET0.
2. The user terminal conducts PDCCH detection in the indicated CORESET0. Since the transmission position of PDCCH is not fixed in CORESET0, the user terminal needs to conduct blind check for many times in CORESET0.
3. When the user terminal detects the PDCCH, it will read the scheduling information about SIB1 and receive the message of SIB1 from the corresponding physical resource. The base station will configure in SIB1 a search space for PDCCH for subsequent system messages, which is a set of candidate locations for scheduling PDCCH for subsequent system messages.
4. The user terminal blindly checks PDCCH in the search space indicated by SIB1.
5. The user terminal receives other SIBs based on the scheduling information in the PDCCH obtained by blind check.

It can be seen that the detection steps of system messages are cumbersome, and it is necessary to blindly check PDCCH for many times. However, the blind check of PDCCH will consume a large amount of power of the user terminal, which does not meet the requirements of power saving for the NR-IoT system.

Therefore, there is a need to optimize the system message receiving and detection process.

In related technologies, information fields included in the Physical Broadcast Channel (PBCH) of the SSB are as shown in Table 1.

TABLE 1

| Parameters | Number of bits | Description |
| --- | --- | --- |
| SystemFrameNumber | 10 | system frame number |
| subCarrierSpacingCommon | 1 | subcarrier spacing of PDCCH and PDSCH for transmitting SIB1 |
| Dmrs-TypeA-Position | 1 | time-domain position of DMRS of PDSCH carrying SIB1 |
| Pdcch-ConfigSIB1 | 8 | configuration of PDCCH related to SIB1 |
| CellBarred | 1 | identification of whether access to the cell is prohibited |
| IntraFreqReselection | 1 | intra-frequency cell reselection parameter |
| Spare | 1 | reserved |
| Harf frame indication | 1 | half frame indication |
| Choice | 1 | indicating whether it is currently an extended MIB message (for forward compatibility) |
| SSB index & ssb-SubcarrierOffset | 3&4 | When the carrier is less than 6 GHz, 3 bits indicate the high 3 bits of SSB index, and the remaining 4 bits indicate the subcarrier offset Kss of SSB, where the value range of Kss is {0, 1, 2 . . . 11}, When the carrier is greater than 6 GHz, 5 bits indicate the subcarrier offset Kss of SSB, where the value range of Kss is {0, 1, 2 . . . , 23}, the remaining 2 bits are reserved bits |
| CRC | 24 | |
| Total including CRC | 56 | |

Based on the wireless communication system mentioned above, for the NR-IoT user terminal, how to simplify the system message detection process and reduce the PDCCH detection are proposed in embodiments of the present disclosure.

Figure 3:
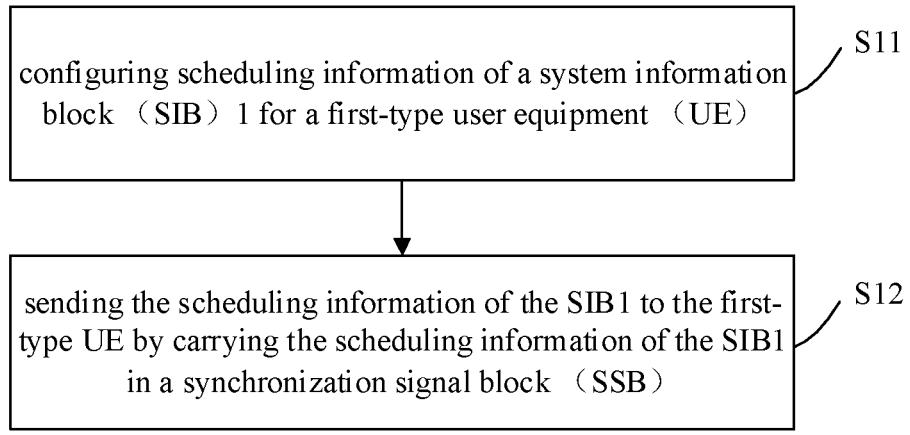
FIG. 3 is a flow chart of a method for information processing according to an example embodiment of the disclosure.

FIG. 3 is a flow chart of a method for information processing according to an example embodiment of the disclosure. As illustrated in FIG. 3, the method for information processing is applied in a base station, and includes following steps.

At step S11, scheduling information of system information block (SIB) 1 is configured for a first-type user equipment (UE).

In this embodiment, the first-type UE is a NR-IoT UE.

In some alternative implementations, configuring the scheduling information of SIB1 for the first-type UE includes:

indicating the scheduling information of SIB1 configured for the first-type UE using a second predetermined information field of SSB.

For example, the second predetermined information field includes a PDCCH-SIB1 configuration information field (for example, Pdcch-ConfigSIB1 in Table 1) and a reserved information filed (for example, Spare in Table 1).

In some alternative implementations, indicating the scheduling information of SIB1 configured for the first-type UE using the second predetermined information field of SSB includes:

indicating the scheduling information of SIB1 configured for this first-type UE using the PDCCH-SIB1 configuration information field of SSB previously used to indicate configuration information of PDCCH of SIB1 (that is, Pdcch-ConfigSIB1 in Table 1).

In some other alternative implementations, indicating the scheduling information of SIB1 configured for the first-type UE using the second predetermined information field of SSB includes:

indicating the scheduling information of SIB1 configured for this first-type UE using both the reserved information field that is not used for information indication (for example, Spare in Table 1) and the PDCCH-SIB1 configuration information field (for example, Pdcch-ConfigSIB1 in Table 1).

In the above solution, configuring the scheduling information of SIB1 for the first-type UE further includes:

configuring the scheduling information of SIB1 for the first-type UE based on a number of bits of different information in the scheduling information of SIB1.

The scheduling information includes at least one of:
a redundant version;
a mapping mode between virtual resource blocks and physical resource blocks;
a modulation coding mode;
a time-domain allocation mode; and
a frequency-domain allocation mode.

In this way, when configuring the scheduling information of SIB1, some restrictions are placed on the scheduling information to match the finite number of bits of the SSB.

For example, the scheduling information of SIB1 is indicated using 8 bits in pdcch-ConfigSIB1. For example, 2 bits indicate the time-domain allocation information; 2 bits indicate the frequency-domain allocation information; 2 bits indicate modulation and demodulation mode; 1 bit indicates the redundant version; 1 bit Indicates the mapping mode between virtual resource blocks and physical resource blocks.

For example, the scheduling information of SIB1 is indicated using both pdcch-ConfigSIB1 and Spare for a total of 9 bits. For example, 3 bits indicate the time-domain allocation information; 3 bits indicate the frequency-domain allocation information; 2 bits indicate the modulation and demodulation mode; 1 bit indicates the redundant version. The mapping between virtual resource blocks and physical resource blocks is fixed.

In the above solution, the method further includes:
indicating a subcarrier offset of the SSB for the first-type UE using a first predetermined information field of the SSB.

The first predetermined information field includes an SSB index & SSB subcarrier offset information field (for example, SSB index& ssb-SubcarrierOffset in Table 1).

In some alternative implementations, indicating the subcarrier offset of the SSB for the first-type UE using the first predetermined information field of the SSB includes:

indicating the subcarrier offset of the SSB using the SSB index & SSB subcarrier offset information field of the SSB (for example, SSB index & ssb-SubcarrierOffset in Table 1).

The SSB index & SSB subcarrier offset information field includes:
a first bit sequence, configured to indicate an index value of the SSB; and
a second bit sequence, configured to indicate the subcarrier offset of the SSB.

The second bit sequence is configured to indicate the subcarrier offset to the first-type UE in response to having a first parameter value.

The second bit sequence is configured to indicate the subcarrier offset of the SSB to a second-type UE in response to having a second parameter value, in which the second-type UE is different from the first-type UE.

In this way, when the second-type UE detects the SSB in step S11, the SSB is considered unavailable and subsequent detection is abandoned.

In some specific implementations, indicating the subcarrier offset of the SSB using the SSB index & SSB subcarrier offset information field of the SSB includes:

in response to a carrier frequency of the SSB being less than 6 GHz, indicating the subcarrier offset of the SSB using the second bit sequence of the first parameter value in the SSB index & SSB subcarrier offset information field of the SSB.

For example, when the carrier is less than 6 GHz, the subcarrier offset of the SSB is indicated by the first parameter value shown in Table 2.

TABLE 2

| ssb-SubcarrierOffset value | Description |
| --- | --- |
| 12 | subcarrier offset 0 |
| 13 | subcarrier offset 4 |
| 14 | subcarrier offset 7 |
| 15 | subcarrier offset 11 |

In some specific implementations, indicating the subcarrier offset of the SSB using the SSB index & SSB subcarrier offset information field of the SSB includes:

in response to the carrier frequency of the SSB being greater than 6 GHz, indicating the subcarrier offset of the SSB using the second bit sequence of the first parameter value and the first bit sequence in the SSB index & SSB subcarrier offset information field of the SSB.

For example, when the carrier frequency is greater than 6 GHz, the two bits reserved for the SSB index and the eight states in ssB-subcarrierOffset (the first parameter value is 24, 25, 26, 27, 28, 29, 30, or 31) may be used to indicate the 24 possible subcarrier offsets one by one.

In step S12, the scheduling information of SIB1 is carried in the synchronous broadcast block (SSB) and sent to the first-type UE.

Thus, the first-type UE receives the SIB1 based on the scheduling information of the SIB1.

The technical solution described in embodiments of the disclosure provides a method for NR-IoT system information transmission. By putting the scheduling information of SIB1 into SSB, the scheduling information of SIB1 can be obtained without performing PDCCH blind check, shortening the time for the first-type UE to detect system messages.

In the above solution, optionally, the method further includes:

step S13 (not shown in FIG. 3), configuring scheduling information of SIBx for the first-type UE, where x is a positive number greater than or equal to 2;

step S14 (not shown in FIG. 3), sending the scheduling information of the SIBx to the first-type UE by carrying the scheduling information of the SIBx in SIB1.

In this way, the first-type UE receives SIBx based on the scheduling information of SIBx.

Since the scheduling information of subsequent SIBs (SIBx) other than SIB1 is carried in SIB1, the scheduling information of subsequent SIBs can be obtained through SIB1. Compared with the method of obtaining the scheduling information of subsequent SIBs through multiple PDCCH blind checks in related technologies, PDCCH detection is removed, which simplifies the system message detection process, thus saving the power overhead of the NR-IoT UE.

In an alternative implementation, carrying the scheduling information of SIBx in SIB1 includes:

transmitting the scheduling information of SIBx by SIB1 through the PDSCH.

As an example, the scheduling information of subsequent SIBs transmitted in the PDSCH of SIB1 contains following contents:

time-domain resource allocation information, which is used to indicate the time slot and the symbol from which SIB1 starts and the duration of SIB1; in the current NR system, four bits are used to indicate;

frequency-domain resource allocation information, which is used to indicate the starting position and frequency-domain size of the frequency resource (the number of bits required is related to the size of the resource to be allocated);

modulation coding mode, indicated by 5 bits;

mapping between virtual resource blocks and physical resource blocks, indicated by 1a bit;

redundant version, indicated by 2 bits; and system message indication.

Since the SSB rewritten no longer has forward compatibility, in order to prevent the previous NR UE from using this synchronous broadcast block for access, the base station needs to instruct the previous NR UE that this synchronous broadcast block cannot be used for access.

The technical solution described in embodiments of the present disclosure provides a method for NR-IoT system information transmission. By putting the scheduling information of SIB1 into SSB and carrying the scheduling information of the subsequent SIB (SIBx) other than SIB1 into SIB1, compared with the method of obtaining the scheduling information of SIB1 and subsequent SIB by performing multiple PDCCH blind checks in related technologies, the scheduling information of SIB1 and subsequent SIB can be obtained without performing PDCCH blind checks, and the detection process of system messages can be simplified by removing PDCCH detection, which shortens the time consumed by the NR-IoT UE to detect system messages, thus saving the power overhead of the NR-IoT UE.

Figure 4:
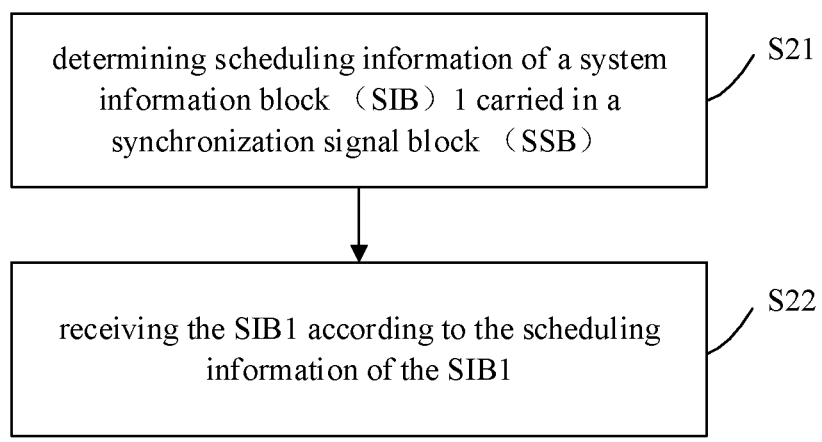
FIG. 4 is another flow chart of a method for information processing according to an example embodiment of the disclosure.

FIG. 4 is another flow chart of a method for information processing according to an example embodiment. As shown in FIG. 4, the method for information processing is applied in a NR-IoT UE, and includes the following steps.

In step S21, scheduling information of a system information block (SIB) 1 carried in a synchronous broadcast block (SSB) is determined.

In step S22, SIB1 is received based on the scheduling information of the SIB1.

In the above solution, optionally, the method further includes:

step S23 (not shown in FIG. 4), determining scheduling information of SIBx carried in SIB1, where x is greater than or equal to 2;

step S24 (not shown in FIG. 4) receiving SIBx based on the scheduling information of the SIBx.

Figure 5:
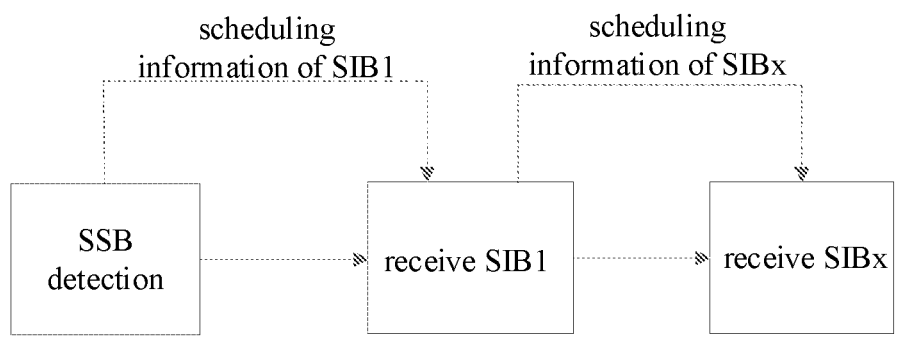
FIG. 5 is another flow chart of obtaining system broadcast messages according to an example embodiment of the disclosure.

FIG. 5 shows another schematic diagram of obtaining system broadcast messages. As shown in FIG. 5, the user terminal first detects SSB and then receives SIB1 based on the scheduling message of SIB1 in SSB, and then receives SIBx based on the scheduling message of SIBx in SIB1. That is, information in the SSB is read, which contains the scheduling information of subsequent SIB1, and SIB1 is received based on the scheduling information of that SIB1; the scheduling information of SIBx is contained in SIB1, and the SIBx is received based on the scheduling information of that SIBx. It can be seen that, compared with FIG. 2, by putting the scheduling information of SIB1 into SSB and by putting scheduling information of subsequent other SIBs into SIB1, the PDCCH blind check is removed and the time of system message detection by the user terminal is shortened.

Since the scheduling information of SIB1 is carried in SSB, and SIB1 also carries the scheduling information of subsequent SIBs other than SIB1, the technical solution described in embodiments of the disclosure can obtain the scheduling information of SIB1 and subsequent SIB (SIBx) without performing PDCCH blind check, simplifying the detection process of system messages, shortening the time consumed by the NR-IoT UE to detect system messages, thus saving the power overhead of the NR-IoT UE.

It should be understood that the example shown in FIG. 5 is an alternative specific implementation, but the disclosure is not limited to this.

It should also be understood that the example in FIG. 5 is only intended to illustrate embodiments of the disclosure, and that various obvious changes and/or substitutions can be made by the technical personnel in the field based on the example in FIG. 5, and the resulting technical solution is still within the scope of embodiments of the present disclosure.

Figure 6:
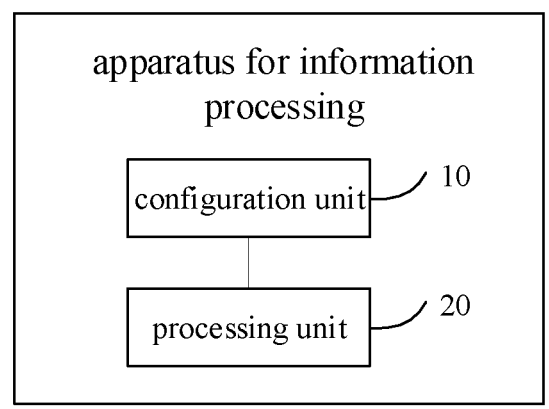
FIG. 6 is a block diagram of an apparatus for information processing according to an example embodiment of the disclosure.

FIG. 6 is a block diagram of an apparatus for information processing according to an example embodiment. The apparatus for information processing is applied to a base station side, and referring to FIG. 6, the apparatus includes a configuration unit 10 and a processing unit 20.

The configuration unit 10 is configured to configure scheduling information of SIB1 for a first-type UE.

The processing unit 20 is configured to send the scheduling information of the SIB1 to the first-type UE by carrying the scheduling information of the SIB1 in an SSB.

In some alternative implementations, the configuration unit 10 is further configured to configure scheduling information of SIBx for the first-type UE, where x is greater than or equal to 2. The processing unit 20 is further configured to send the scheduling information of SIBx to the first-type UE by carrying the scheduling information of SIBx in the SIB1.

In some alternative implementations, the processing unit 20 is further configured to transmit the scheduling information of the SIBx by the SIB1 through PDSCH.

In some alternative implementations, the configuration unit 10 is further configured to indicate a subcarrier offset of the SSB for the first-type UE using a first predetermined information field of the SSB.

In some alternative implementations, the configuration unit 10 is further configured to indicate the subcarrier offset of the SSB using an SSB index & SSB subcarrier offset information field of the SSB.

The SSB index & SSB subcarrier offset information field includes:
  a first bit sequence, configured to indicate an index value of the SSB; and
  a second bit sequence, configured to indicate the subcarrier offset of the SSB.

The second bit sequence is configured to indicate the subcarrier offset to the first-type UE in response to having a first parameter value.

In the above solution, the second bit sequence is configured to indicate the subcarrier offset of the SSB to a second-type UE in response to having a second parameter value, in which the second-type UE is different from the first-type UE.

In some alternative implementations, the configuration unit 10 is further configured to:
  in response to a carrier frequency of the SSB being less than 6 GHz, indicate the subcarrier offset of the SSB using the second bit sequence of the first parameter value in the SSB index & SSB subcarrier offset information field of the SSB.

In some alternative implementations, the configuration unit 10 is further configured to:
  in response to a carrier frequency of the SSB being greater than 6 GHz, indicate the subcarrier offset of the SSB using the second bit sequence of the first parameter value and the first bit sequence in the SSB index & SSB subcarrier offset information field of the SSB.

In some alternative implementations, the configuration unit 10 is further configured to indicate the scheduling information of the SIB1 configured for the first-type UE using a second predetermined information field of the SSB.

In some alternative implementations, the configuration unit 10 is further configured to:
  indicate the scheduling information of the SIB1 configured for the first-type UE using a PDCCH-SIB1 configuration information field of the SSB, wherein the PDCCH-SIB1 configuration information field is previously used to indicate PDCCH configuration information of the SIB1; or
  indicate the scheduling information of the SIB1 configured for the first-type UE using both a reserved information field and the PDCCH-SIB1 configuration information field of the SSB, wherein the reserved information filed is previously not used for information indication.

In some alternative implementations, the configuration unit 10 is further configured to: configure the scheduling information of the SIB1 for the first-type UE based on a number of bits of different information in the scheduling information of the SIB1.

The scheduling information includes at least one of:
  a redundant version;
  a mapping mode between virtual resource blocks and physical resource blocks;
  a modulation coding mode;
  a time-domain allocation mode; and
  a frequency-domain allocation mode.

As for the apparatus in the above embodiments, the specific mode of operation of each module has been described in detail in the embodiments of this method, so detailed explanation will not be made here.

In practical application, the specific structure of the above configuration unit 10 and processing unit 20 may be implemented by the CPU (Central Processing Unit), MCU (Micro Controller Unit), DSP (Digital Signal Processer) or PLC (Programmable Logic Controller) and the like in the apparatus for information processing or in the base station to which the apparatus for information processing belongs.

The apparatus for information processing described in this embodiment can be arranged on the base station side.

Those skilled in the art should understand that functions of each processing module in the apparatus for information processing of embodiments of the present disclosure can be understood by referring to the above description of the method for information processing applied to the base station side. Each processing module in the apparatus for information processing of embodiments of the present disclosure may be implemented by an analog circuit implementing the functions described in embodiments of the disclosure, and may also be implemented by running software that performs the functions described in embodiments of the disclosure on a terminal.

The apparatus for information processing described in embodiments of the disclosure can put the scheduling information of SIB1 into SSB and carry the scheduling information of subsequent SIBs (SIBx) other than SIB1 into SIB1, so that the NR-IoT UE can obtain the scheduling information of SIB1 and subsequent SIBs without performing PDCCH blind check, which shortens the time for the NR-IoT UE to detect system messages, thus saving the power overhead of the NR-IoT UE.

Figure 7:
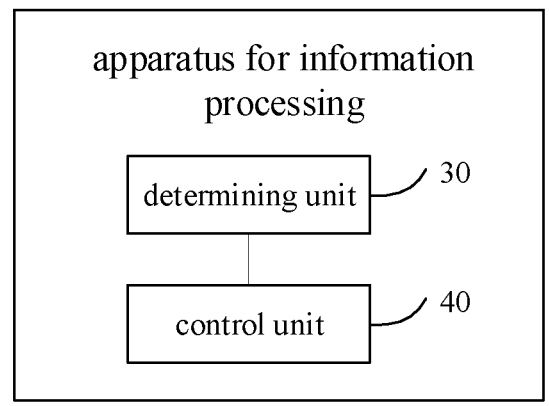
FIG. 7 is another block diagram of an apparatus for information processing according to an example embodiment of the disclosure.

FIG. 7 is another block diagram of an apparatus for information processing according to an example embodiment. The apparatus for information processing is applied to a UE side, and referring to FIG. 7, the apparatus includes a determining unit 30 and a control unit 40.

The determining unit 30 is configured to determine scheduling information of SIB1 carried in an SSB.

The control unit 40 is configured to receive the SIB1 according to the scheduling information of the SIB1.

In some alternative implementations, the determining unit 30 is further configured to determine scheduling information of SIBx carried in the SIB1, where x is greater than or equal to 2. The control unit 40 is further configured to receive the SIBx according to the scheduling information of the SIBx.

As for the apparatus in the above embodiments, the specific mode of operation of each module has been described in detail in the embodiments of this method, so detailed explanation will not be made here.

In practical application, the specific structure of the above determining unit 30 and control unit 40 may be implemented by the CPU, MCU, DSP or PLC and the like in the apparatus for information processing or in the UE to which the apparatus for information processing belongs.

The apparatus for information processing described in this embodiment can be arranged on the UE side.

Those skilled in the art should understand that functions of each processing module in the apparatus for information processing of embodiments of the present disclosure can be understood by referring to the above description of the method for information processing applied to the base station side. Each processing module in the apparatus for information processing of embodiments of the present disclosure may be implemented by an analog circuit implementing the functions described in embodiments of the disclosure, and may also be implemented by running software that performs the functions described in embodiments of the disclosure on a terminal.

The apparatus for information processing described in embodiments of the disclosure can obtain the scheduling information of SIB1 and subsequent SIBs without performing PDCCH blind check, which shortens the time for the NR-IoT UE to detect system messages, thus saving the power overhead of the NR-IoT UE.

Figure 8:
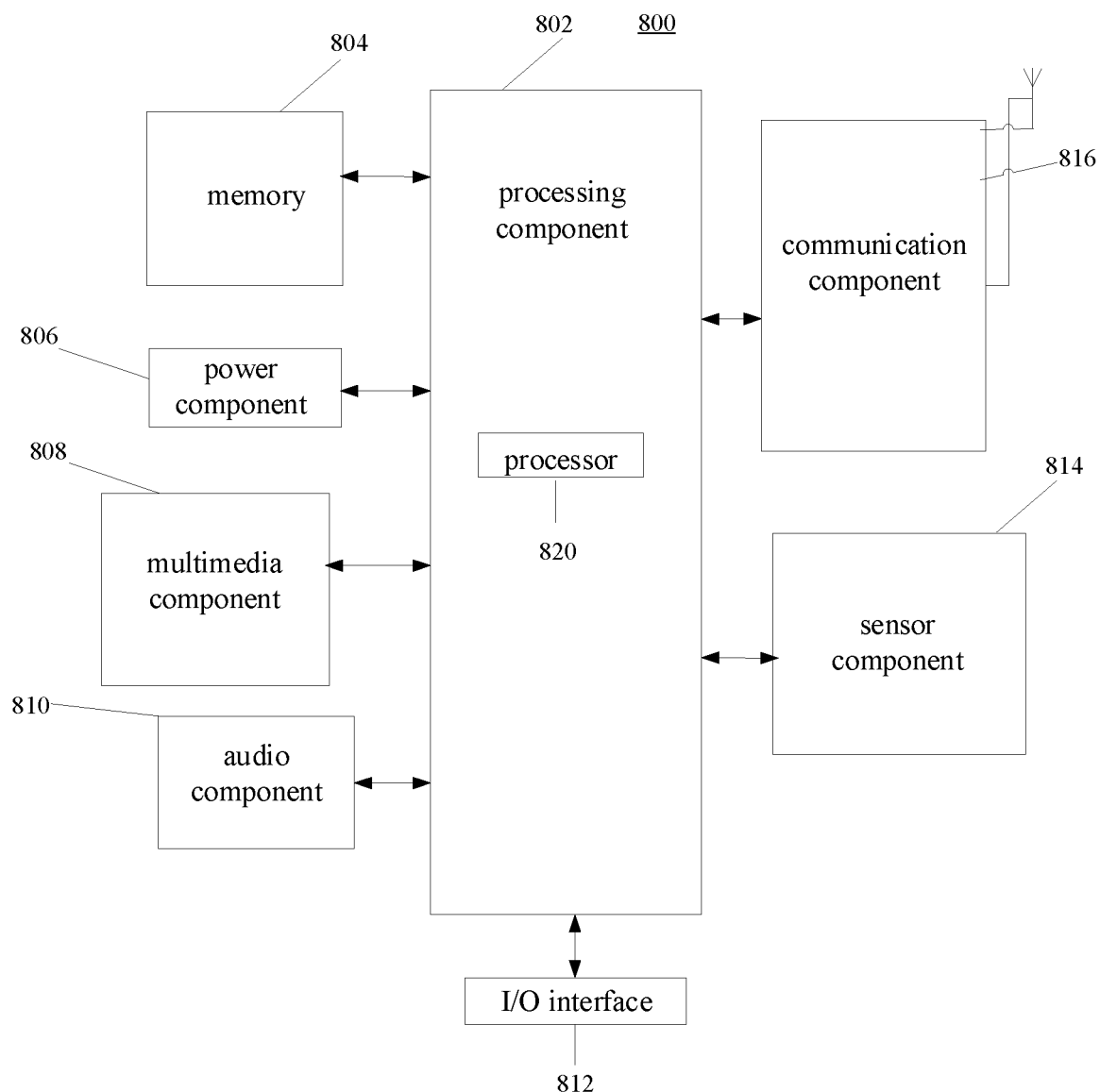
FIG. 8 is a block diagram of an apparatus for information processing according to an example embodiment of the disclosure.

FIG. 8 is a block diagram of an apparatus 800 for implementing information processing according to an example embodiment of the disclosure. For example, the apparatus 800 may be a mobile phone, a computer, a digital broadcasting terminal, a messaging device, a game console, a tablet device, a medical equipment, a fitness equipment, a personal digital assistant, etc.

As illustrated in FIG. 8, the apparatus 800 may include one or more components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 800. Examples of such data include instructions for any applications or methods operated on the apparatus 800, contact data, phonebook data, messages, pictures, video, etc. The memory 804 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 800. The power component 806 may include a power management system, one or more power sources, and any other components associated with the generation, management, and distribution of power in the apparatus 800.

The multimedia component 808 includes a screen providing an output interface between the apparatus 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the apparatus 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the apparatus 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 800. For instance, the sensor component 814 may detect an open/closed status of the apparatus 800, relative positioning of components, e.g., the display and the keypad, of the apparatus 800, a change in position of the apparatus 800 or a component of the apparatus 800, a presence or absence of user contact with the apparatus 800, an orientation or an acceleration/deceleration of the apparatus 800, and a change in temperature of the apparatus 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 816 is configured to facilitate communication, wired or wirelessly, between the apparatus 800 and other devices. The apparatus 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an example embodiment, the apparatus 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, to perform the method as described in the above any embodiment.

In an example embodiment, there is also provided a non-transitory computer-readable storage medium including instructions, such as included in the memory 804, executable by the processor 820 in the apparatus 800, for performing the above-described methods. For example, the non-transitory computer-readable storage medium may be a ROM, a RAM, a CD-ROM, a magnetic tape, a floppy disc, an optical data storage device, and the like.

A computer storage medium. When executable instructions in the storage medium are executed by a processor of a base station, the base station is enabled to implement a method for information processing, the method including:
configuring scheduling information of a SIB1 for a first-type UE; and
sending the scheduling information of the SIB1 to the first-type UE by carrying the scheduling information of the SIB1 in an SSB.

As an implementation, the executable instructions are configured to implement:
configuring scheduling information of SIBx for the first-type UE, where x is greater than or equal to 2; and
sending the scheduling information of SIBx to the first-type UE by carrying the scheduling information of SIBx in the SIB1.

As an implementation, the executable instructions are configured to implement: transmitting the scheduling information of the SIBx by the SIB1 through PDSCH.

As an implementation, the executable instructions are configured to implement: indicating a subcarrier offset of the SSB for the first-type UE using a first predetermined information field of the SSB.

As an implementation, the executable instructions are configured to implement: indicating the subcarrier offset of the SSB using an SSB index & SSB subcarrier offset information field of the SSB;
wherein the SSB index & SSB subcarrier offset information field includes:
a first bit sequence, configured to indicate an index value of the SSB; and
a second bit sequence, configured to indicate the subcarrier offset of the SSB;
wherein the second bit sequence is configured to indicate the subcarrier offset to the first-type UE in response to having a first parameter value.

As an implementation, the executable instructions are configured such that, the second bit sequence is configured to indicate the subcarrier offset of the SSB to a second-type UE in response to having a second parameter value, in which the second-type UE is different from the first-type UE.

As an implementation, the executable instructions are configured to implement: in response to a carrier frequency of the SSB being less than 6 GHz, indicating the subcarrier offset of the SSB using the second bit sequence of the first parameter value in the SSB index & SSB subcarrier offset information field of the SSB.

As an implementation, the executable instructions are configured to implement: in response to a carrier frequency of the SSB being greater than 6 GHz, indicating the subcarrier offset of the SSB using the second bit sequence of the first parameter value and the first bit sequence in the SSB index & SSB subcarrier offset information field of the SSB.

As an implementation, the executable instructions are configured to implement: indicating the scheduling information of the SIB1 configured for the first-type UE using a second predetermined information field of the SSB.

As an implementation, the executable instructions are configured to implement:
indicating the scheduling information of the SIB1 configured for the first-type UE using a PDCCH-SIB1 configuration information field of the SSB, wherein the PDCCH-SIB1 configuration information field is previously used to indicate PDCCH configuration information of the SIB1; or
indicating the scheduling information of the SIB1 configured for the first-type UE using both a reserved information field and the PDCCH-SIB1 configuration information field of the SSB, wherein the reserved information filed is previously not used for information indication.

As an implementation, the executable instructions are configured to implement: configuring the scheduling information of the SIB1 for the first-type UE based on a number of bits of different information in the scheduling information of the SIB1;

wherein the scheduling information comprises at least one of:
a redundant version;
a mapping mode between virtual resource blocks and physical resource blocks;
a modulation coding mode;
a time-domain allocation mode; and
a frequency-domain allocation mode.

Those skilled in the art should understand that the functions of each program in the storage medium of this embodiment can be understood by referring to the relevant description of the method for information processing applied to the base station side as described in the embodiments.

Figure 9:
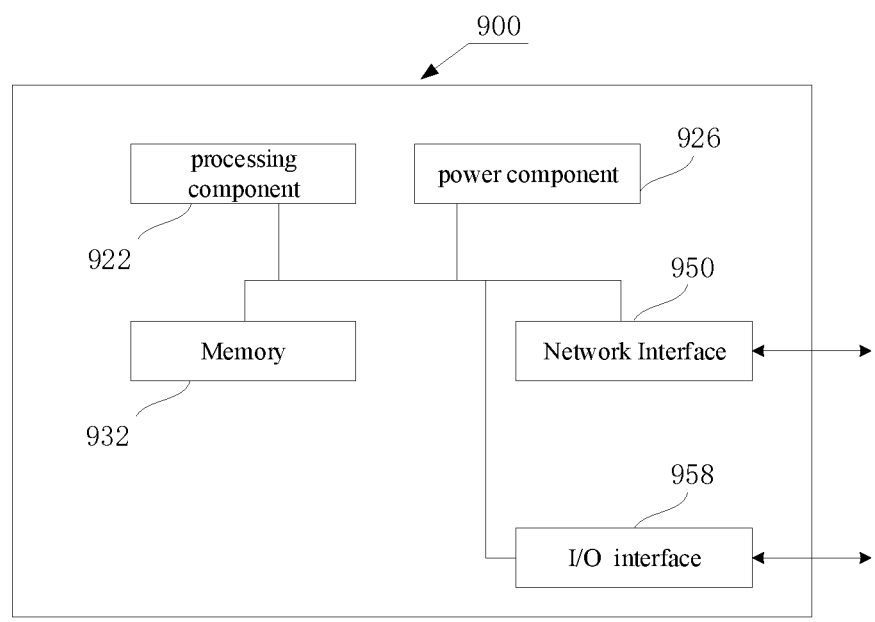
FIG. 9 is another block diagram of an apparatus for information processing according to an example embodiment of the disclosure.

FIG. 9 is a block diagram of an apparatus 900 for information processing according to an example embodiment. For example, the apparatus 900 may be provided as a server. Referring to FIG. 9, the apparatus 900 includes a processing module 922, which in turn includes one or more processors, as well as memory resources represented by a memory 932, for storing instructions that can be executed by the processing module 922, such as applications. Applications stored in memory 932 may include one or more modules each corresponding to a set of instructions. In addition, the processing component 922 is configured to execute instructions to perform the above method for information processing applied to the base station side.

The apparatus 900 may also include a power component 926 configured to perform power management of the apparatus 900, a wired or wireless network interface 950 configured to connect the apparatus 900 to the network, and an input/output (I/O) interface 958. The apparatus 900 can operate operating systems based on the memory 932, such as Windows Server™, Mac OS X™, Unix™, Linux™, FreeBSD™ or the like.

A computer storage medium. When executable instructions in the storage medium are executed by a processor of a UE, the NR-IoT UE is enabled to implement a method for information processing, the method including:
determining scheduling information of SIB1 carried in an SSB; and
receiving the SIB1 according to the scheduling information of the SIB1.

As an implementation, the executable instructions are configured to implement:
determining scheduling information of SIBx carried in the SIB1, where x is greater than or equal to 2; and
receiving the SIBx according to the scheduling information of the SIBx.

The technical solutions recorded in embodiments of the present disclosure may be arbitrarily combined without conflict.

After considering the specification and practicing the disclosure herein, those skilled in the art will easily think of other embodiments of the present disclosure. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The specification and embodiments are only be illustrative, and the true scope and spirit of the disclosure are indicated by the following claims.

It should be understood that the present disclosure is not limited to the precise structure described above and shown in the drawings, and various modifications and changes may be made without departing from its scope. The scope of the present application is only limited by the appended claims.

What is claimed is:

1. A method for information processing, comprising:
configuring scheduling information of a system information block SIB1 for a first-type user equipment (UE); and
sending the scheduling information of the SIB1 to the first-type UE by carrying the scheduling information of the SIB1 in a synchronization signal block SSB;
the method further comprising:
indicating a subcarrier offset of the SSB for the first-type UE using a first predetermined information field of the SSB.

2. The method of claim 1, further comprising:
configuring scheduling information of SIBx for the first-type UE, where x is greater than or equal to 2; and
sending the scheduling information of SIBx to the first-type UE by carrying the scheduling information of SIBx in the SIB1.

3. The method of claim 2, wherein carrying the scheduling information of SIBx in the SIB1 comprises:
transmitting the scheduling information of the SIBx by the SIB1 through a physical downlink shared channel PDSCH.

4. The method of claim 1, wherein indicating a subcarrier offset of the SSB for the first-type UE using a first predetermined information field of the SSB comprises:
indicating the subcarrier offset of the SSB using an SSB index & SSB subcarrier offset information field of the SSB;
wherein the SSB index & SSB subcarrier offset information field comprises:
a first bit sequence, configured to indicate an index value of the SSB; and
a second bit sequence, configured to indicate the subcarrier offset of the SSB;
wherein the second bit sequence is configured to indicate the subcarrier offset to the first-type UE in response to having a first parameter value.

5. The method of claim 4, wherein the second bit sequence is configured to indicate the subcarrier offset of the SSB to a second-type UE in response to having a second parameter value, wherein the second-type UE is different from the first-type UE.

6. The method of claim 4, wherein indicating the subcarrier offset of the SSB using the SSB index & SSB subcarrier offset information field of the SSB comprises:
in response to a carrier frequency of the SSB being less than 6 GHz, indicating the subcarrier offset of the SSB using the second bit sequence of the first parameter value in the SSB index & SSB subcarrier offset information field of the SSB.

7. The method of claim 4, wherein indicating the subcarrier offset of the SSB using the SSB index & SSB subcarrier offset information field of the SSB comprises:
in response to a carrier frequency of the SSB being greater than 6 GHz, indicating the subcarrier offset of the SSB using the second bit sequence of the first parameter value and the first bit sequence in the SSB index & SSB subcarrier offset information field of the SSB.

8. The method of claim 1, wherein configuring scheduling information of SIB1 for the first-type UE comprises:
indicating the scheduling information of the SIB1 configured for the first-type UE using a second predetermined information field of the SSB.

9. The method of claim 8, wherein indicating the scheduling information of the SIB1 configured for the first-type UE using a second predetermined information field of the SSB comprises:
  indicating the scheduling information of the SIB1 configured for the first-type UE using a PDCCH-SIB1 configuration information field of the SSB, wherein the PDCCH-SIB1 configuration information field is previously used to indicate PDCCH configuration information of the SIB1; or
  indicating the scheduling information of the SIB1 configured for the first-type UE using both a reserved information field and the PDCCH-SIB1 configuration information field of the SSB, wherein the reserved information filed is previously not used for information indication.

10. The method of claim 8, wherein configuring the scheduling information of the SIB1 for the first-type UE comprises:
  configuring the scheduling information of the SIB1 for the first-type UE based on a number of bits of different information in the scheduling information of the SIB1;
  wherein the scheduling information comprises at least one of:
  a redundant version;
  a mapping mode between virtual resource blocks and physical resource blocks;
  a modulation coding mode;
  a time-domain allocation mode; and
  a frequency-domain allocation mode.

11. A method for information processing, comprising:
  determining scheduling information of a system information block SIB1 carried in a synchronization signal block SSB, wherein a first predetermined information field in the SSB is indicative of a subcarrier offset of the SSB for the first-type UE; and
  receiving the SIB1 according to the scheduling information of the SIB1.

12. The method of claim 11, further comprising:
  determining scheduling information of SIBx carried in the SIB1, where x is greater than or equal to 2; and
  receiving the SIBx according to the scheduling information of the SIBx.

13. An apparatus for information processing, comprising:
  a processor; and
  a memory configured to store instructions executable by the processor;
  wherein, the processor is configured to implement the method for information processing of claim 1 by executing the executable instructions.

14. An apparatus for information processing, comprising:
  a processor; and
  a memory configured to store instructions executable by the processor;
  wherein, the processor is configured to implement operations by executing the executable instructions, the operations comprising:
  determining scheduling information of a system information block SIB1 carried in a synchronization signal block SSB, wherein a first predetermined information field in the SSB is indicative of a subcarrier offset of the SSB for the first-type UE; and
  receiving the SIB1 according to the scheduling information of the SIB1.

15. The apparatus of claim 14, wherein the processor is further configured to perform:
  determining scheduling information of SIBx carried in the SIB1, where x is greater than or equal to 2; and
  receiving the SIBx according to the scheduling information of the SIBx.

16. The apparatus of claim 15, wherein the scheduling information of the SIBx is transmitted by the SIB1 through a physical downlink shared channel PDSCH.

* * * * *